Dec. 15, 1959    R. H. WELKER    2,917,269
FLOW REGULATOR
Filed June 20, 1958
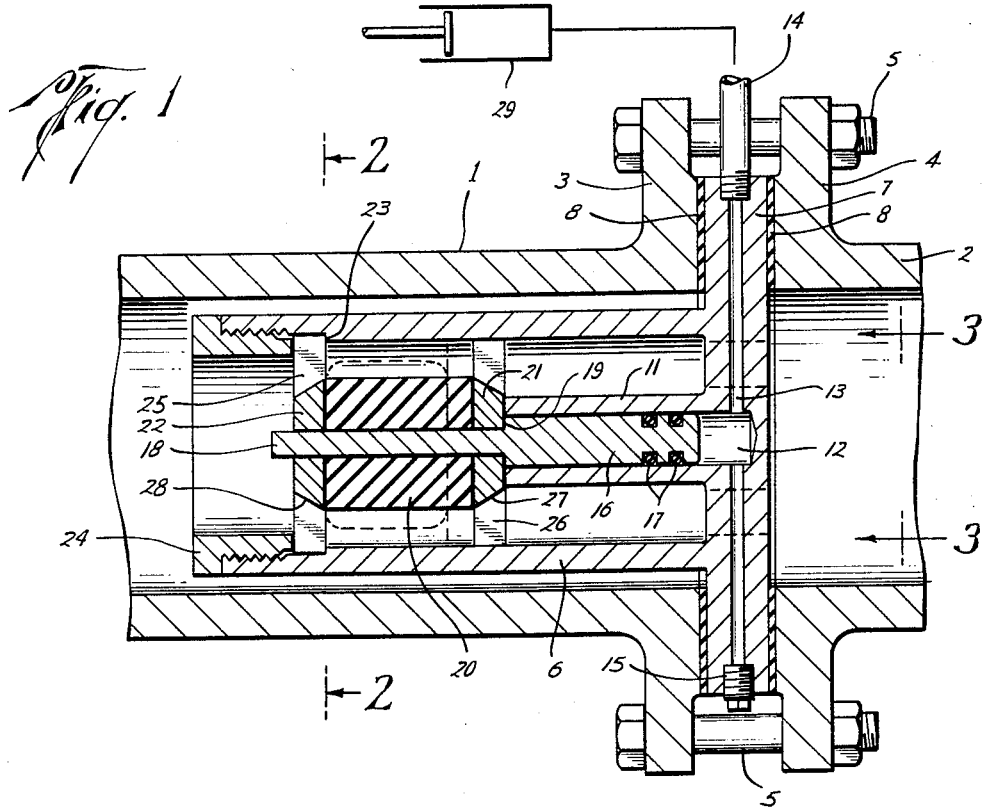
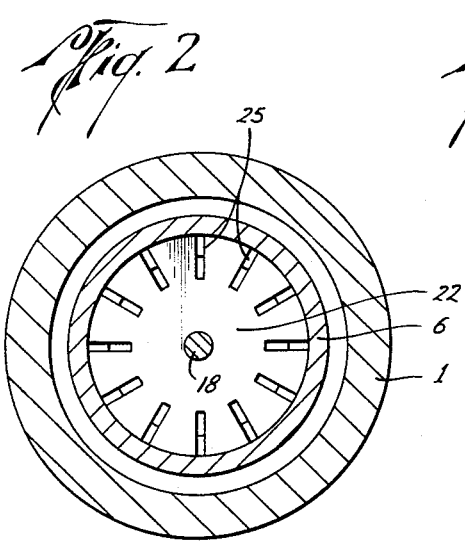
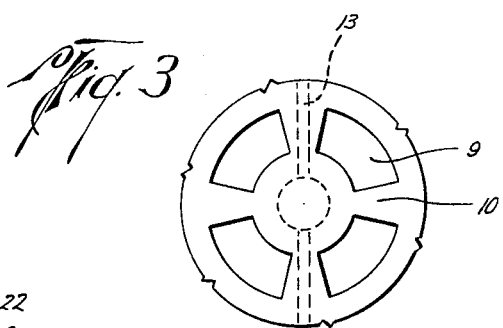
Robert H. Welker
INVENTOR.
BY G.C. Helmig
ATTORNEY

United States Patent Office 2,917,269
Patented Dec. 15, 1959

2,917,269

FLOW REGULATOR

Robert H. Welker, Houston, Tex.

Application June 20, 1958, Serial No. 743,323

8 Claims. (Cl. 251—62)

This invention relates to an improvement in flow regulators and more particularly to a simple and low cost insert unit which can be easily and quickly installed internally of a transmission conduit at any selected coupling joint to provide for laminar fluid flow with minimum turbulence and for controlled variation in volume of such flow.

It is an object of the invention to provide a flow line insert assembly having axially extending and concentrically arranged inner and outer members with a normal clearance therebetween as an annular flow path parallel to or in straight line continuity with the direction of flow transmission, and one of which members is a solid valve plug capable of being deformed for a radial growth to vary the annular clearance passage between the concentric members.

A further object of the invention is to provide a unit having a central rubber block disposed axially within and of smaller external diameter than the internal diameter of a tubular body intended for fitment axially within the end of one conduit section and for clamped securement between conduit coupling flanges by an annular flange carried by the body and provided with a port for connecting an exterior source of actuating pressure fluid with a piston cylinder mounted interiorly of the body and by which axial pressure is transmitted to squeeze the rubber block and thereby cause radial displacement of the rubber particles for an increased block diameter.

Another object of the invention is to provide an improved unit assembly in which a solid rubber block is centralized within a tubular body by being fitted on a piston rod and interposed between and with its opposite end faces engaging a pair of abutment spiders, one of which is fixed with the body and slidably receives the free end of the piston rod as a guide support therefor and the other of which has slide guide bearing at its rim on the body and is movable with the piston toward and from the fixed abutment spider and both of which spiders are radially slotted in regions outwardly of the block periphery with the slotted bottoms inclined inwardly away from their block abutment faces for a gradual change of radial slot size in the direction of flow for a funneling of stream action and a reduction of eddy current tendencies in the vicinity of the slotted passages.

Other objects and advantages of the invention will become apparent from the following specification having reference to the accompanying drawing wherein Fig. 1 is a longitudinal sectional view showing the improved regulator unit positioned in a flow conduit and Figs. 2 and 3 are section and elevation views respectively on lines 2—2 and 3—3 of Fig. 1.

The drawing illustrates a joint between adjacent ends of a pair of pipe line sections 1 and 2 having annular coupling flanges 3 and 4 held together by a series of clamp bolts 5. The control unit here involved includes a main body or tubular wall 6 to be telescoped or inserted within an end portion of one of the conduit sections and to provide a flow chamber extending axially of the conduit. At one end the tubular member 6 is formed with a transverse wall which includes an external annular coupling flange 7 to fit between the pipe coupling flanges 3 and 4 and mount the regulator unit in place. Sealing gaskets 8—8 can be interposed between the adjoining flange faces. The transverse end wall also includes an internal slotted portion containing a series of arcuate flow openings 9 (see Fig. 3) with intervening radial webs 10 which support a forwardly projecting boss 11 within the interior of and radially spaced from the annular body wall 6. This boss is hollow and is drilled out from its forward end and into the transverse wall to afford a piston motor cylinder space 12 extending coaxially of the longitudinal center line of the unit. A transverse radial port 13 is drilled through the transverse wall in intersecting relation with the closed end of the cylinder space 12 and at each outer end of the drilled port 13 its bore is enlarged and internally threaded. One end is for connection with a delivery conduit 14 for supplying hydraulic fluid under pressure to the piston cylinder 12 and the other end of the port is normally closed by a plug 15, positioned after an installation has been completed and the hydraulic system filled with liquid and bled of air.

A reciprocatory piston 16, preferably having one or more O-rings 17 carried in annular grooves thereof, fits within the pressure cylinder and has a reduced diameter stem 18 projecting outwardly from a bearing shoulder 19, in radial alignment with the end of the cylinder wall 12 when the piston is retracted. Sleeved on the piston stem 18 is an axially elongated core or annular block 20 of rubber or other suitable nonmetallic elastic deformable material. Material known in the trade as Hycar is an oil resistant synthetic rubber having the desired characteristics of incompressibility and elasticity. Opposite end faces of the block 20 are in abutment with and may be vulcanized or cemented to adjacent solid disk-like faces of round spiders 21 and 22. The spider 22 is peripherally seated against an internal shoulder 23 machined in the wall of the tubular body member 6 and is clamped in place by a screw threaded gland nut 24. At its central portion the fixed spider 22 is apertured to fit the free end of the piston stem 18 as a guide bearing therefor. The other disk 21 is also centrally apertured to fit the stem 18 in abutment with its shoulder 19. Peripherally the disk 21 is in slide bearing engagement with the interior cylindrical surface of the tubular member 6.

The external diameter of the deformable sleeve 20 when the same is free of axial stress is considerably less than the internal diameter of the tubular member 6, and the annular clearance extends in the axial direction of pipe line flow so that straight line or laminar flow is provided through the unit with a minimum of frictional resistance and flow line turbulence. As parts of the flow line path, there are openings in both of the disks or spiders 21 and 22 in their regions which are outwardly beyond the unexpanded periphery of the rubber sleeve or block 20. Such openings preferably are formed by a number of radial slots 25 cut inwardly from the rim of the disk 22 and a similar set of radial slots cut inwardly from the rim of the disk 21. The number and width of the slots will be predetermined by the flow volume desired for any particular installation. In the case of the disk 21, the bottom 27 of each slot is inclined inwardly away from the abutment face for the rubber sleeve for funneling liquid flow into the annular space around the sleeve. In like manner, the bottom 28 of each slot 25 is tapered away from the abutment face of the disk 22 for channeling the flow in a manner to minimize turbulence.

When the rubber sleeve 20 interposed between the disks 21 and 22 is free of axial stress, the disk 21 will be spaced its greatest distance away from the disk 22 and will be in stop abutment with the free end of the cylinder wall 11. Therefore, maximum flow through the transmission line can take place without valved restriction. When restriction for any reason is called for, hydraulic fluid under pressure will be supplied to the cylinder space 12 to project the piston 16 and move the disk 21 toward the abutment disk 22 and thereby axially squeeze the rubber sleeve between its end faces. In compensation for the change in axial dimension, the incompressible particles of the elastic sleeve will flow or be distended radially and the peripheral surface of the sleeve will bulge outwardly into the annular clearance space and toward the interior of the annular wall 6. Such outward displacement, as illustrated by broken lines in Fig. 1, of the sleeve will constrict passage flow volume and at maximum radial growth of the rubber sleeve element the sleeve periphery will contact and press against the tubular wall 6 and seal off further fluid flow. Flow will be re-established whenever hydraulic pressure in the piston cylinder is relieved so that the energy stored in the elastic sleeve returns the piston and allows the sleeve to restore itself to its original diameter.

The hydraulic actuating system connected to the pipe line 14 may include a servo or master pump indicated generally by the reference character 29 in Fig. 1. Depending on the type of installation, the cylinder may be a part of any of various types of regulating devices including those which are clock-operated and those which are operated in response to conduit pressure or pressure differences on opposite sides of the flow regulator unit. The unit may serve either or both as a complete cut-off and as an adjustable metering valve.

A preferred embodiment of the invention has been described in detail but it is to be understood that modifications can be made within the scope of the appended claims.

What is claimed is:

1. In a flow regulator, a tubular member, a solid core of an incompressible elastic material coaxially disposed within the tubular member in peripherally spaced relation thereto, an abutment fixedly carried by the tubular member in bottoming engagement with one end of the core, a piston cylinder extending axially of the tubular member beyond the other end of said core, a slide piston assembly having a portion in abutment with said other end of the core and having another portion enclosed by said cylinder, a radial web joining said cylinder with the tubular member and an outwardly directed radial mounting flange on the tubular member coplanar with the web for mounting between a pair of coupling flanges, said radial mounting flange and the web having a pressure fluid passage extended radially through both thereof and into the piston cylinder and through which pressure fluid may be supplied for action on said piston in applying axial pressure on the core for its radial expansion in varying the spacing dimension peripherally thereof.

2. In a flow regulator, a tubular member having an external mounting flange and an internal axially apertured web at one end, a piston cylinder carried by said web and projected therefrom axially of the tubular member, said flange and web having a pressure fluid supply passage leading radially therethrough to the cylinder, a piston slidable in said cylinder and having a stem projected therefrom, an incompressible elastic block surrounding said stem in peripherally spaced relation with said tubular member, a pair of abutment spiders engaging opposite ends of said block and one thereof being secured for movement with said slide piston and the other thereof slidably receiving the same as a guide therefor and means fixedly securing the last mentioned spider in the tubular member.

3. In combination, a pair of end to end connected flow conduits having clamped together end coupling flanges, a flow regulator unit including a tubular member projected in nested relation within one of said conduits, a piston cylinder extending axially within said tubular member, a radial end wall having a portion projected outwardly from the tubular member as an annular flange clamped between said coupling flanges and also having a portion extending inwardly from said tubular member and mounting said cylinder, said end wall also having an axially extending opening therethrough for communicating the tubular member on one side of the end wall with the flow conduit on the other side of the end wall and said end wall having a cylinder communicating port projected outwardly therefrom for connection with a pressure fluid source, a fluid pressure responsive piston slidable in said cylinder and provided with a stem projected beyond the cylinder, a piston stem receiving apertured guide disk fixed in the tubular member and a block of elastic incompressible material surrounding the piston stem and abutting at opposite ends with said guide element and slide piston and being normally peripherally spaced from the tubular member to cooperate therewith in providing a laminar flow path through the conduits, said block being radially expansive in response to axial piston travel for regulating the size of such laminar flow space.

4. In a flow regulator, a piston cylinder, a piston within the cylinder, means for supplying pressure fluid to the cylinder for actuating said piston, an outwardly projecting piston stem, a spider disk slidably guiding the free end of said piston stem, a tubular member fixedly mounting said spider disk and said cylinder in axially spaced apart relation, a block of elastic incompressible material surrounding the stem in bearing engagement at one end with the spider and normally in peripherally spaced relation with the tubular member and a second spider disk in abutment with the opposite end of said block and movable with the piston in peripheral sliding bearing engagement with the tubular member, the peripheral portions of both spiders being radially slotted for establishing a flow path around the block periphery and the bottoms of said slots being tapered away from the block abutting spider faces and merging at said faces with the block peripheral surface.

5. In a pipe line flow control unit assembly, a tubular wall providing a straight-through laminar passage interiorly thereof, axially spaced apart walls fixedly secured with said tubular wall and projected transversely across said passage, one of the transverse walls having a centrally apertured hub portion presenting a stop abutment disc facing toward the other wall and also having flow openings extended in the axial direction of the passage and through the wall portion radially outwardly of said hub portion, a pressure fluid actuated motor including a slidable plunger having a slide guide bearing at one end in said centrally apertured disc and at the opposite end in the other of said transverse walls and cooperating with the latter to form a plunger actuated pressure fluid chamber, actuating pressure fluid supply means communicating with said chamber, a solid block of elastic deformable material sleeved on the plunger and positioned thereby centrally of said passage and of a normal diameter less than the diameter of said passage with one end face in stop bearing abutment with said hub portion and a bearing abutment face carried by said plunger of the actuating motor and engaged with the other end face of said centrally disposed block.

6. An assembled flow regulator unit comprising a main body having a tubular wall for insertion in a fluid flow conduit in axial alignment therewith and providing a straight-through laminar flow passage interiorly of said tubular wall, a pair of relatively slidable piston and piston receiving cylinder members positioned concentrically within the straight-through passage, means fixedly securing one of said members to said mounting body interiorly therewith in coaxial relation with and centrally of said straight-through passage, a motion transmitting radially disposed bearing face secured to and axially movable with the other of said members, an abutment spider fixed to said body and positioned thereby transversely of the passage in axially spaced relation to the fixed member and provided with a radial bearing face in axially spaced opposed relation to the first mentioned bearing face for cooperation therewith, a block of elastic deformable material centrally disposed in said straight-through passage in end to end engagement with the opposed bearing faces and whose unstressed free diameter is less than passage diameter, said block being radially expansible to restrict said passage in response to axial compression stress thereon between said bearing faces upon their relative axial travel toward one another and port means in the unit leading to the piston receiving cylinder member for delivery of an exterior pressure fluid in controlling such travel.

7. A pipe line flow regulator unit inclinding a tubular body having an annular passage extending axially thereof, coupling means on the tubular body cooperative with a fluid transmission conduit in mounting the tubular body in passage coaxial alignment with the conduit for laminar flow through said annular passage in straight line stream continuity with the fluid transmission conduit, piston and cylinder members having slide fit one on the other and enclosing a fluid pressure chamber therebetween, a mounting web extending transversely of the tubular member and fixedly securing one of said members coaxially and centrally of the annular passage, port means in said web communicating with said fluid pressure chamber for delivery thereto of pressure actuating fluid in the control of axial slide projection of the other member, a block of elastic deformable material centrally disposed in said annular passage and having its respective ends in engagement with said members and normally in peripheral clearance and annular passage defining relation with said tubular body, block locating means on said other member having one part in end face abutment with one end of said block and having another part projected axially into the block and a transversely extended spider fixed to said tubular member within the annular passage and centrally abutting with the opposite end face of said block for cooperation with said other member in applying axial stress on the block during member projection.

8. For controlling the flow volume of a fluid transmission pipe line, a flow regulator assembly comprising a tubular body having an annular wall defining an axially directed annulus channel interiorly thereof, coupling means on said wall for attachment of the assembly in end to end relation and channel axial alignment with a fluid transmission line, a spider fixedly positioned by said annular wall and extended across the interior channel therein, an axially shiftable spider extending across said channel in axially spaced relation to the first spider and having peripherally guided slide bearing on the interior face of said annular wall, said spiders having central hub portions presenting abutment surfaces facing one another and having axially extended passage flow openings through the portions thereof radially outwardly of said central hub portions, a rubber block occupying the axial space between and in abutment at opposite ends with the hub presented abutment surfaces radially inwardly of said passage flow openings and being centrally disposed within and in predetermined peripheral clearance to said interior face of the annular wall for defining the annulus channel flow area, force applying means having motion transmitting connection with the shiftable spider and movable in response to energy supplied thereto to vary said peripheral clearance by stress deformation of the rubber block between said hub portions and an internal web joining said force applying means with the annular wall and containing an energy supply conduit leading to the force applying means from an externally controlled supply source.

References Cited in the file of this patent
UNITED STATES PATENTS

| | | |
|---|---|---|
| 1,521,081 | Dooling | Dec. 30, 1924 |
| 1,781,224 | Gilg | Nov. 11, 1930 |
| 2,279,976 | Faust | Apr. 14, 1942 |
| 2,429,546 | Boynton | Oct. 21, 1947 |
| 2,611,438 | Hanline | Sept. 23, 1952 |

FOREIGN PATENTS

| | | |
|---|---|---|
| 512,895 | Italy | Feb. 2, 1955 |